United States Patent [19]

Meckler

[11] Patent Number: 5,471,852
[45] Date of Patent: Dec. 5, 1995

[54] POLYMER ENHANCED GLYCOL DESICCANT HEAT-PIPE AIR DEHUMIDIFIER PRECONDITIONING SYSTEM

[76] Inventor: Milton Meckler, 930 20th St. #2, Santa Monica, Calif. 90403

[21] Appl. No.: 215,225

[22] Filed: Mar. 22, 1994

Related U.S. Application Data

[63] Continuation-in-part of Ser. No. 16,152, Feb. 5, 1993, Pat. No. 5,297,398, which is a continuation-in-part of Ser. No. 726,040, Jul. 5, 1991, Pat. No. 5,191,771.

[51] Int. Cl.[6] .................................................. F25D 23/00
[52] U.S. Cl. ........................................... 62/271; 62/94
[58] Field of Search ............................... 62/94, 271, 114

[56] References Cited

U.S. PATENT DOCUMENTS

| | | | |
|---|---|---|---|
| 2,156,293 | 5/1939 | Kaufman | 62/271 |
| 2,182,453 | 12/1939 | Sellew | 62/271 |
| 2,715,945 | 8/1955 | Hankison et al. | 62/271 |
| 3,417,574 | 12/1968 | Kelley | 62/271 |
| 3,774,374 | 11/1973 | Dufour et al. | 55/316 |
| 4,011,731 | 3/1977 | Meckler | 62/2 |
| 4,941,324 | 7/1990 | Peterson et al. | 62/94 |
| 4,981,021 | 1/1991 | Assaf | 62/271 |
| 5,020,334 | 6/1991 | Wilkinson | 62/271 |
| 5,022,241 | 6/1991 | Wilkinson | 62/271 |
| 5,097,668 | 3/1992 | Albers et al. | 62/94 |
| 5,189,884 | 3/1993 | Sami | 62/114 |
| 5,191,771 | 3/1993 | Meckler | 62/271 |
| 5,297,398 | 3/1994 | Meckler | 62/271 |

Primary Examiner—Henry A. Bennet
Assistant Examiner—William C. Doerrler
Attorney, Agent, or Firm—William H. Maxwell

[57] ABSTRACT

A liquid glycol enhanced with a polymer-salt solution such as a desiccant in an air pre-conditioner system with a heat-pipe having its heat absorber section in an outside air inlet duct following water vapor adsorption into the desiccant by a contacter section of a dehumidifier, the heat-pipe having its heat rejecter section in an exhaust air duct and preferably preceeding water vapor discharge from the desiccant by a regenerater section of the dehumidifier, a desuperheater for efficient refrigerant compression, a reflux boiler for desiccant regeneration, and a glycol interchanger recovery system for desiccant recovery.

27 Claims, 3 Drawing Sheets

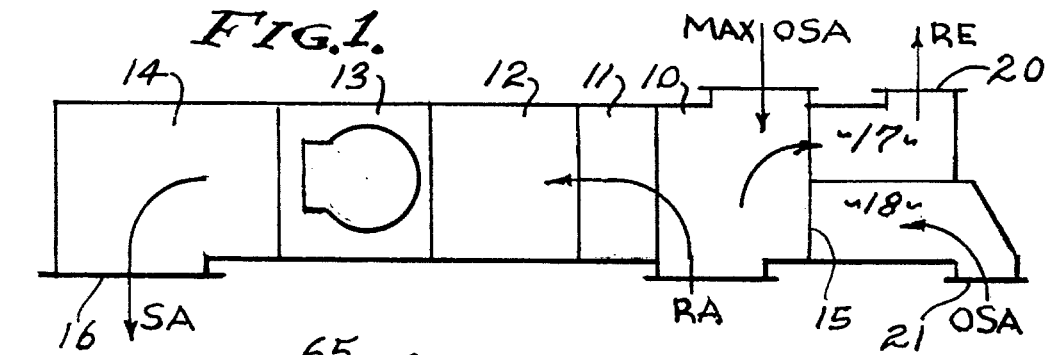
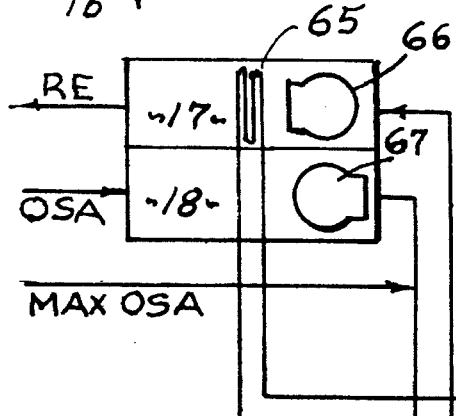
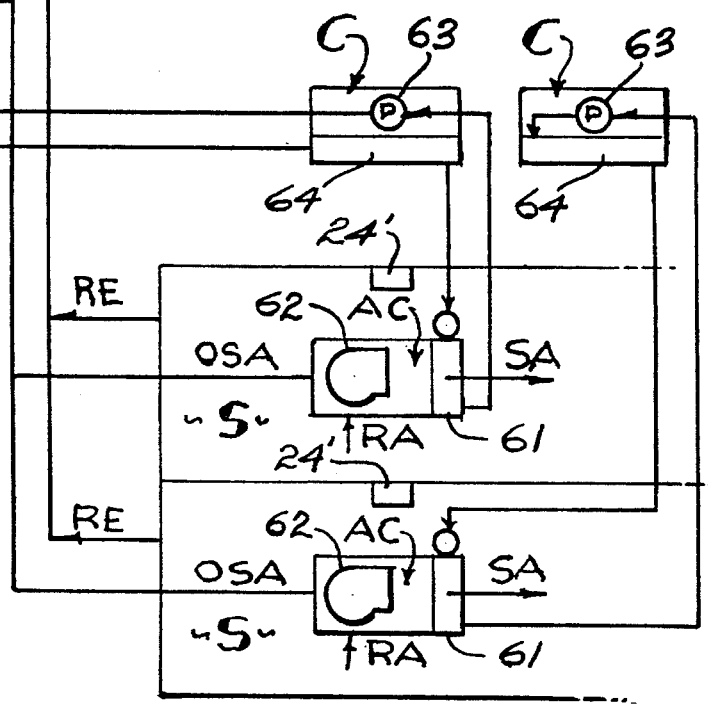
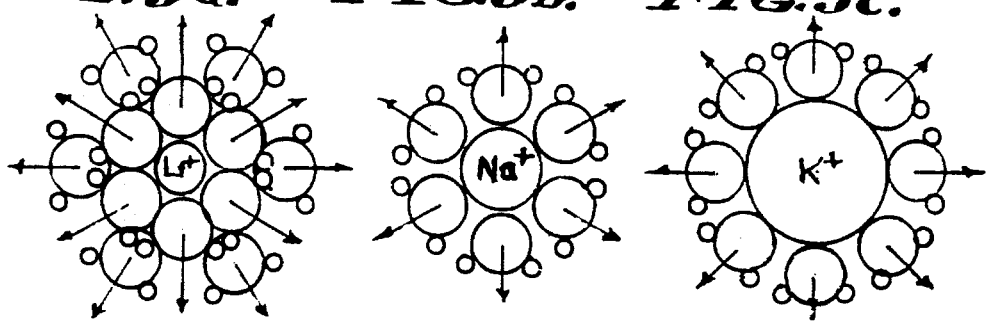

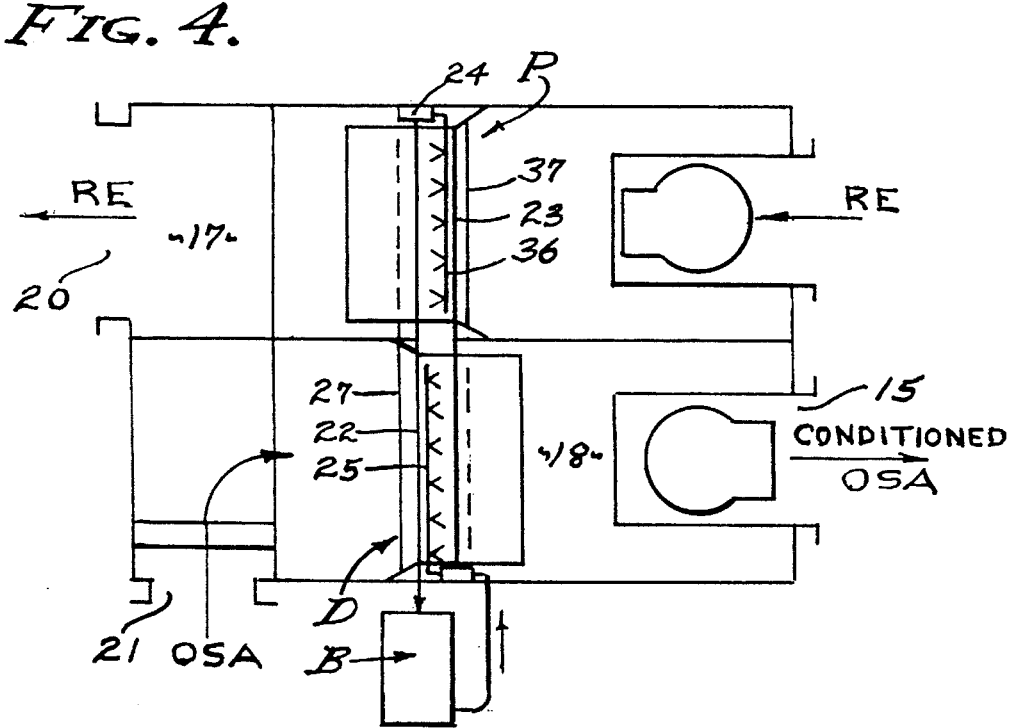
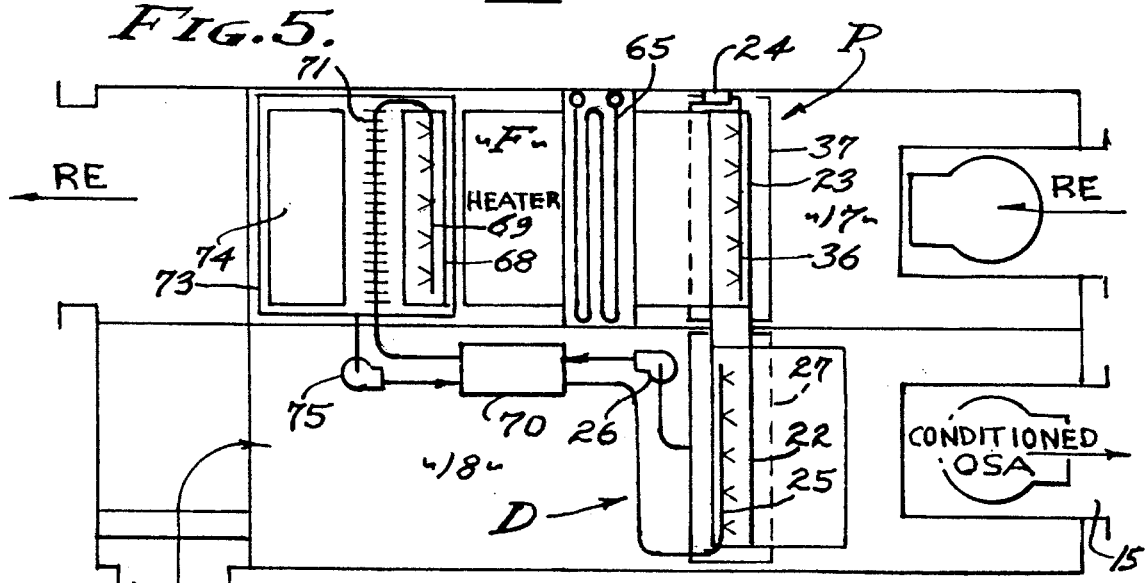
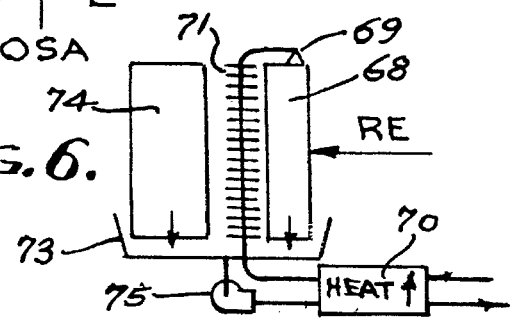
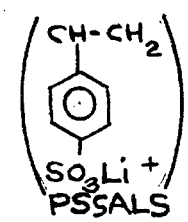

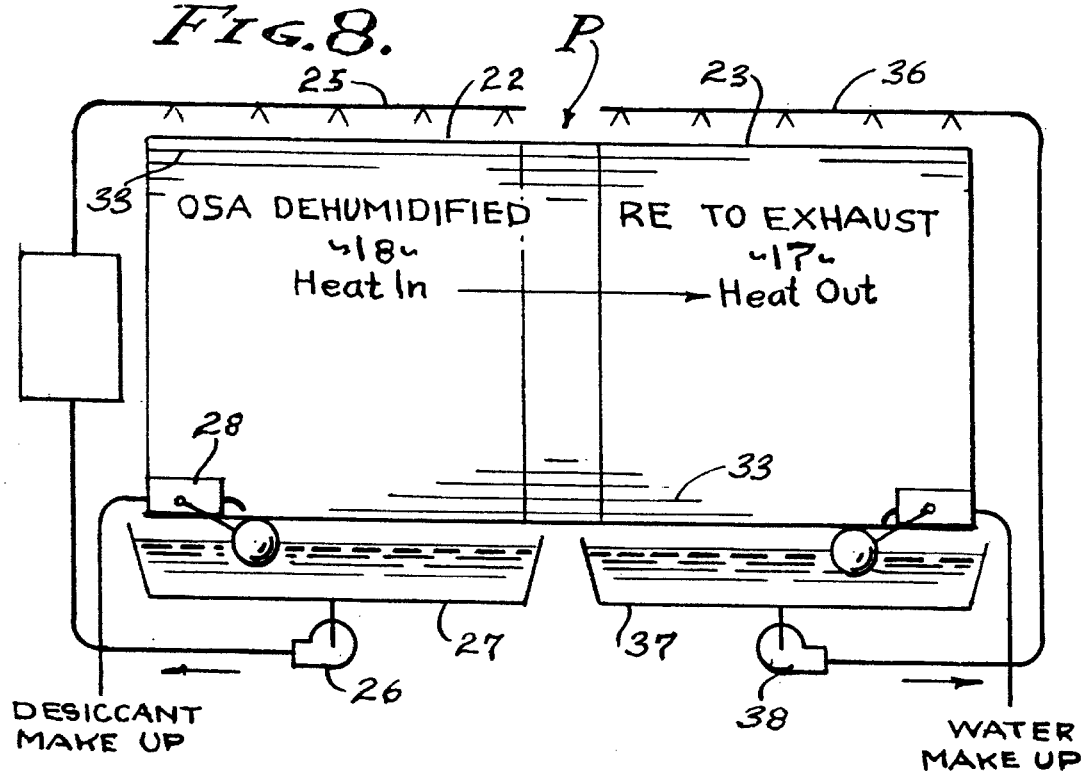
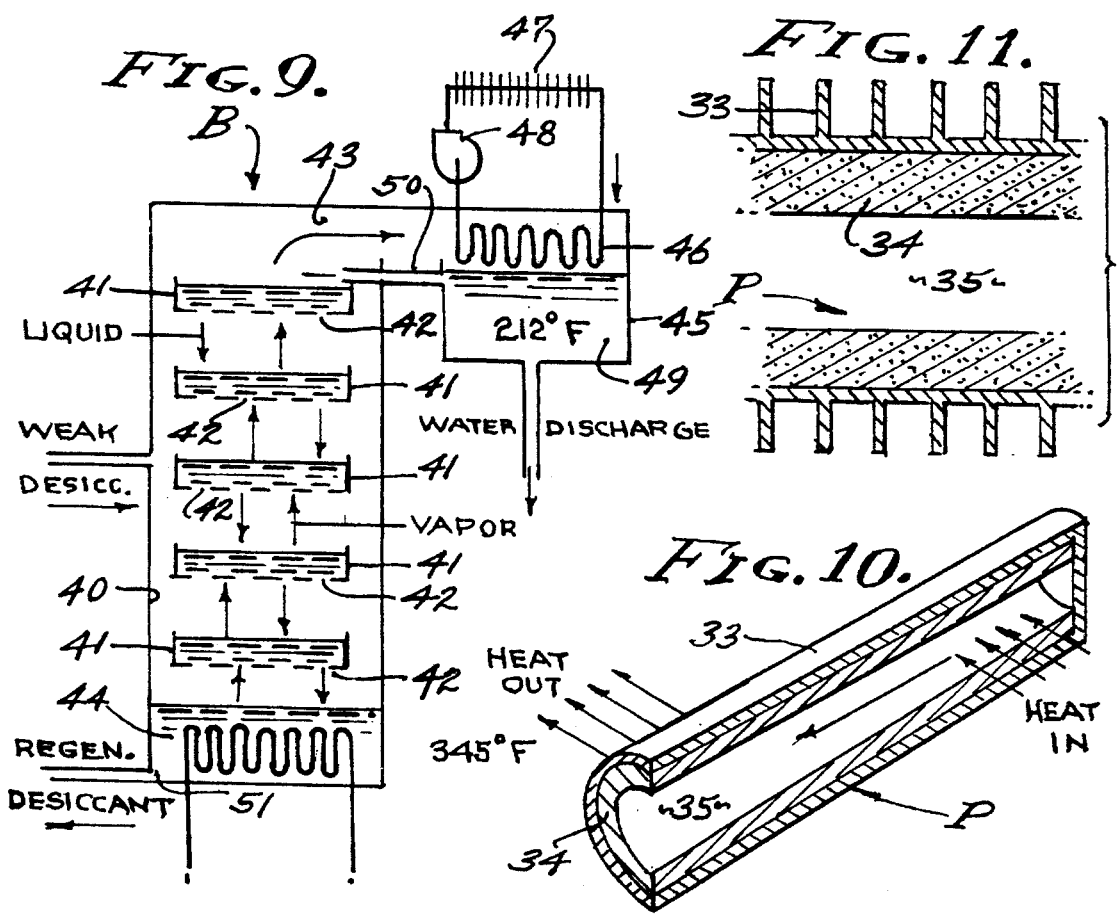

POLYMER ENHANCED GLYCOL DESICCANT HEAT-PIPE AIR DEHUMIDIFIER PRECONDITIONING SYSTEM

This is a continuation in part application of application Ser. No. 08/016,152 filed Feb. 5, 1993, now U.S. Pat. No. 5,297,398, entitled POLYMER DESICCANT AND SYSTEM FOR DEHUMIDIFIED AIR CONDITIONING, in turn a Continuation In Part application of application Ser. No. 07/726,040 filed Jul. 5, 1991, now U.S. Pat. No. 5,191,771, entitled POLYMER DESICCANT AND SYSTEM FOR DEHUMIDIFIED AIR CONDITIONING.

BACKGROUND OF THE INVENTION

This invention relates to air pre-conditioning wherein a portion of the outside air intake is efficiently dehumidified. Heretofore, the desiccants employed have been expensive and because of their nature the dehumidifying section of air conditioning equipment has been fabricated of exceedingly expensive corrosive resistant materials. Accordingly, it is a primary object of this invention to provide a relatively inexpensive and substantially non-corrosive desiccant that is economically effective and which is adapted to use in relatively inexpensive equipment made of commercial grade materials such as protectively treated steel and the like. Cost effective stand-alone installation of a dehumidifier is an object of this invention, all of which is accomplished without change to the downstream refrigeration and/or heating equipment.

It is an object of this invention to employ Glycol as a desiccant and to enhance its moisture absorption capacity by adding to it a Polymer. Suitable soluble compounds from the glycol family are Tri ethylene glycol and/or tetra ethylene glycol, a preferred compound being Polyethyleneglycol. Additives such as Fructose, Silica gel, Alumina silicates, and the like can be included to enhance the liquid carrying capacity of the glycol.

There are a number of polymer materials known to be useful as desiccants to absorb water moisture and to be regenerated for repeated use, it being an object of this invention to enhance a liquid glycol with a liquid polymer, for use as a desiccant. Such polymers which are feasible to be used with glycol desiccants are as follows:

Polystyrene Sulfonic acid lithium salt

Polystyrene sulfonic acid sodium salt

Polyacrylic acid ammonium salt

Poly (methacrylic acid) sodium salt

Poly (n-vinylacetamide vinyl sulfonate) sodium salt

Polyacrylic acid sodium salt

Cellulose sulfonate sodium salt

Methyl cellulose

The preferred desiccant additive is sulfonated Lithium $SO_3Li$, PSSALS in a solution and at a viscosity that can be pumped and sprayed with a heat range of 80° F. to 225° F. db. The sorption properties of this Lithium polymer salt solution is enhanced 4% to 15% of weight fraction gain by adding it to Tri ethylene glycol (TEG) 10% (by weight). In practice, the improved performance is greater than the algebraic addition prediction for the mixture. And, it is clear that the moisture absorption capacity of the TEG- PSSALS mixture is far superior as it produces unexpected results when compared with known prior art desiccants.

It is a liquid glycol desiccant enhanced with a liquid polymer material with which this invention is particularly concerned, and to this end it is an object to provide the same in the form of an improved hygroscepic desiccant fluid.

Water vapor sorption by polymers is a recognized advantage, the water uptake capability being most important. Ion-dipole interaction is to be considered, reference being made to FIGS. 3a, 3b and 3c of the drawings, which illustrate the comparisons between the use of Lithium, Sodium and Potassium. It becomes apparent that the Lithium ion Li+ accommodates a far greater amount of water of the three, due to its small cationic size as compared with either Sodium Na+ of Potassium K+. The atomic weight and corresponding cationic size of various elements are to be considered as follows:

| Li | Lithium | 6.9 |
|----|---------|-----|
| Na | Sodium | 23 |
| K | Potassium | 39 |
| Ca | Calcium | 40 |
| Cs | Cesium | 133 |

Therefore, is it an object of this invention to employ the better of the known salts in the sulfonation of the aforementioned polymers employed as a hygrosopic liquid, especially as a desiccant additive to glycol. Accordingly, Polystyrene Sulfonate Acid Lithium Salt solution or PSSALS is the preferred embodiment use herein (see FIG. 7).

Air conditioning involves generally, an outside air supply, a supply air discharge into a building interior, return air intake from the building interior, and a relief air discharge. The polymer enhanced glycol solution air pre-conditioner of the present invention is adapted to the outside air intake of the existent air conditioning equipment. It is an object of this invention to advantageously employ a portion of the outside supply air intake for desiccant treatment. It is also an object of this invention to advantageously employ a heat-pipe to extract heat after dehumidification and to dissipate that heat. The air dehumidifier intake section herein disclosed replaces an air intake or power section of usual equipment and is preferably attached to a blower section unit that separates the relief air from the return air, as shown.

An air conditioning system involves the discharge of relief air that is replaced by outside supply air. The volume ratio of these two columns of air varies as a result of variations leakage from the conditioned air space involved, the relief air being stale interior air retrieved at a place or places of higher interior temperature and where stale air exists. Consequently, relief air is substantially warmer than supply air (the conditioned air), it being an object of this invention to advantageously employ warmer relief air before its discharge as exhaust air, by dissipating its usable heat energy through a heat exchanger into outside air. It is still another object of this invention to advantageously employ the heat energy rejected by the heat-pipe, as will be described.

It is an object of this invention to directly process the weakened higher viscosity desiccant through a multi-effect reflux boiler concentrator, using the direct application of heat with a counter flow of desiccant from which water vapor is driven out of the weakened water saturated liquid and desiccant enriched vapor is condensed and returned to the contactor section or sections as strengthened desiccant.

It is an object of this invention to control the temperature of liquid refrigerant returned to the refrigeration compressor, so that compressor capacity is maximized. In practice, this is accomplished with a heat exchanger that desuperheats and condenses the refrigerant vapor, and simultaneously recovers heat from recirculated glycol or polymer enhanced glycol which is then distributed to a spray header and moisture extracted by heated exhaust air.

It is also an object of this invention to efficiently regenerate the-glycol-polymer enhanced desiccant solution (a mixture), a portion of which could be lost as a result of vaporization, by providing a reflux boiler to enrich the desiccant by condensing the glycol vapors and avoiding their loss.

It is still another object of this invention to implement heat-pipes so as to function as a dehumidification contacter (heat in) and to function as a regeneration (heat out) heat source for reconstituting a strong desiccant mixture of glycol based polymer enhanced desiccant. The heat in ends of the heat-pipes operate in the incoming outside air OSA, while the heat out ends of the heat-pipes operate in the outgoing relief air RE, there being heater means to raise the relief air to an effective regenerative temperature. Additionally, the heat of condensation from the dehumidification process is recovered for desiccant regeneration, and the AC heat of compression is also recovered for desiccant regeneration.

SUMMARY OF THE INVENTION

A polymer enhanced glycol solution provided as the desiccant in the form of an improved hygroscopic liquid that can be processed and transported most efficiently in cost effective dehumidification equipment. Of the known salts that may be used in the formation of such a desiccant is preferably one of small cationic size such as Lithium, Sodium or Potassium. These polymer materials do not readily vaporize and are reasonably stable for the purpose intended, and they are sulfonated and retained in solution and liquid state for transport between and effective processing at the contacter section and regenerater section of the dehumidifier. The preferred additive is sulfonated Lithium, for its small dipole configuration as illustrated in FIG. 3a of the drawings, a cost effective material that is, for example, approximately two thirds the cost of a comparable aqueous Lithium Chloride solution, when prepared for the purpose under consideration. And, by employing either a glycol or a polymer-salt solution as specified herein, corrosive effect upon the equipment is minimized to the extent that cost effective materials can now be used in their construction. Accordingly, commercial grade low cost materials can be used to replace high cost prior art materials.

The aforesaid employment of polymer-salt additive for dehumidification is advantageously accomplished with 70% to 90% glycol by weight, preferably Tri ethylene glycol (TEG) so as to provide a desiccant solution that has an increased moisture adsorption capacity. In practice, moisture adsorption capacity is increased at least 4% and up to approximately 15%, by weight of the moisture laden desiccant mixture.

A feature of this invention is that the dehumidified air discharge is through heat-pipe means that removes heat added to the outside intake air in the preceeding process of adsorption. Another feature of this invention is the use of relief air discharge over the heat rejecter portion of the heat-pipe means whereby heat energy in the relief air is advantageously employed and supplemented by a controllable heat source to operate the regenerater section of the dehumidifier.

It is still another object of this invention to combine a dehumidifier and a heat-pipe for simultaneous dehumidification and heat rejection from outside air, ahead of refrigeration or heating by downstream equipment. In accordance with this invention, the heat absorber section of the heat-pipe means serves as the adsorption section of the dehumidifier, its heat transfer surface being wetted with the desiccant, preferably with the glycol enhanced sulfonated Lithium solution mixture, as described herein. In the summer mode of operation, outside dehumidified air is pre-cooled. In the winter mode of operation, outside dehumidified air is permitted to add heat through inherent removal by the heat-pipe. The downstream air conditioning equipment operates in either the summer or winter mode.

The regeneration of weakened desiccant can be conducted on a unit basis with a regenerater section assigned to each contacter section, or on a central service basis with a common return to and supply from a remoted regenerator unit of most efficient design. Further, a most significant feature of this invention is the higher viscosity of the glycol enhanced polymer salt solution used as the desiccant, wherein a multi stage reflux boiler efficiently regenerates the desiccant solution mixture without the loss of the glycol which is subject to vaporization.

The foregoing and various other objects and features of this invention will be apparent and fully understood from the, following detailed description of the typical preferred forms and applications thereof, throughout which description reference is made to the accompanying drawings.

THE DRAWINGS

FIG. 1 is a longitudinal plan view illustrating the system of the present invention, with the preconditioner installed ahead of a downstream air conditioner.

FIG. 2 illustrates a multiplicity of downstream air conditioner units serviced by a stand alone air preconditioner.

FIGS. 3a, 3b and 3c illustrate the comparison in the cationic size of Lithium, Sodium and Potassium ions, the preferred salts used herein to form the polymer-salt solution as desiccant.

FIG. 4 illustrates the air preconditioner of the present invention in a first embodiment form wherein regeneration of the desiccant is by means of an external reflux boiler.

FIG. 5 illustrates the air preconditioner of the present invention in a second embodiment form wherein regeneration of the desiccant is by means of internal heat transfer.

FIG. 6 is an elevational diagram of the glycol recovery means shown in FIG. 5.

FIG. 7 is a diagram that illustrates a Lithium anionic polymer.

FIG. 8 is a transverse elevational view illustrating the "heat in" and "heat out" sides of the heat-pipes as they are employed in this system.

FIG. 9 is a diagramatic elevational view of the reflux boiler as it is used in the first embodiment disclosed herein.

FIG. 10 is a fragmentary section of a heat-pipe configuration as it is employed herein.

And, FIG. 11 is an enlarged sectional view showing the finned feature of the heat-pipes.

PREFERRED EMBODIMENTS

Referring now to the drawings, FIG. 1 illustrates typical refrigeration air conditioning equipment comprised of a power return section a filter section 11, a coil section 12, a blower section 13, and a diffuser and final filter section 14. The necessary refrigeration compressor and condenser (not shown) are included in the coil section 12, or they are external. The power section 10 is preferably a blower section that includes means that separates return air RA into recirculated supply air SA which is supplemented by incoming outside air OSA air and into relief air$_{RE}$ which is exhausted to outside atmosphere. That is, a portion of the conditioned interior air is discharged as relief air RE, and it is replaced by new incoming outside air OSA. In practice, the discharge temperature of incoming outside air OSA into the power return section 10 is proximate to the outside air temperature, while the discharge temperature of relief air is that of the warmer interior air. The sections 10–14 discharge supply air SA into the conditioned interior at a temperature set by thermostat control means (not shown). The downstream air conditioning equipment is state of the art, having an intake duct at 15 to receive dehumidified outside air, and a discharge duct 16 to deliver conditioned supply air into a building structure. The power return section 10 is in open communication with the intake duct 15 and receives dehumidified outside air OSA therefrom. The power section 10 is characterized by damper means or the like (not shown) that separates a portion of the return air for discharge to atmosphere via a discharge duct 17 corresponding in capacity to an intake duct 18 (see FIG. 1), ducts 17 and 18 opening at the interface of power section 10 with the dehumidifier contactor and regenerator means D later described.

In accordance with this invention, the structure of the dehumidifier sections are of commercial grade materials that require the desiccant to be substantially non-corrosive, and to this end I have provided a glycol-polymer solution in the form of a hygroscopic liquid. As specified above, there are a number of elements and their atomic weights to be considered, and among which are the following:

|    |           |      |
|----|-----------|------|
| Li | Lithium   | 6.9  |
| Na | Sodium    | 23   |
| K  | Potassium | 39   |
| Ca | Calcium   | 40   |
| Cs | Cesium    | 133  |

These materials when added to the anionic polymer solutions, as described herein, will vary in their corrosiveness, it being determined that some well within tolerance for contact with commercial grade materials such as steel that is protectively coated as by a paint or sealant, plating, or galvanized and the like, without undue corrosive action. The selected material or element is also selected for its cationic size (see FIGS. 3a, 3b and 3c), a material having the smaller ion size being preferable order to accomodate a greater number of water clusters in surrounding hydration spheres, as is illustrated. Accordingly, Lithium Li is preferred, since its atomic weight size are very and cationic small, and because its corrosiveness is known to be tolerable when using the commercial grade materials specified herein. For a comparison, Helium H has a lower atomic weight of one (1) and therefore a smaller cationic size, but when sulfonated into a salt solution its corrosive action is intolerable for a cost effective structure of the type under consideration.

| Polystyrenesufonic acid lithium salt | PSSALS |
|---|---|
| Polystyrenesulfonic acid sodium salt | PSSASS |
| Polyacrylic acid ammonium salt | PAAAS |
| Poly(mehtacrylic acid) sodium salt | PMAASS |
| Poly(vynylacetamide, vinyl sulfonate) sodium salt | PVAVSSS |
| Poly acrylic acid sodium salt | PAASS |
| Cellulose sulfate sodium salt | CSSS |
| Methyl cellulose | MS |

These solutions have suitable sorption, adsorption and stability properties.

Present commercially available liquid glycols are as follows:

Tri ethylene glycol

Tetra ethylene glycol

Penta ethylene glycol

Neopentyl glycol

Penta erythritol

Present commercially available additives to the foregoing polymers and glycols to enhance their liquid carrying capacity are materials as follows:

Fructose

Silica gel

Alumina silicates

Polysatyrene sulfonic acid lithium salt PSSALS

Poly n-vinylacetamide vinyl sulfonate lithium salt PNVSLA

In accordance with this invention, liquid glycols are enhanced as desiccants by the agition thereto of polymer materials. The preferred polymers are PSSALS and PNVSLA materials which increase the moisture carrying capacity substantially. The preferred glycol is Polyethylene Glycol.

Polyethylene Glycols are found in a family of llnear polymers formed by the addition reaction of ethylene oxide. The generalized formula for Polyethylene Glycols is:

$$HO-(CH_2CH_3O)_n-H-$$

Where "n" is the average number of repeating oxyethylene groups. The repeating ether linkages and terminal hydroxyl groups give rise to the water solubility of the Polyethylene Glycols. Each polyethylene Glycol or PEG is designated by a number that represents its average molecular weight. For example, PEG 600 consists of a distribution of polymers of varying molecular weights with an average of 600, which corresponds to an average number of repeating oxyethylene groups ("n") of 13. Polyethylene Glycols are available in average weights ranging from 200 to 8000. All Polyethylene Glycols are water soluble. At 20° C. the liquid PEGs form clear aqueous solutions in all proportions, and a wide range of substances are soluble in Polyethylene Glycol, as disclosed herein. Also, the hydroxyl functionality of the Polyethylene Glycols allows them to exhibit hygroscopicity, which is their ability to attract and retain moisture.

In accordance with this invention, a liquid sorbent material is provided by mixing a sorbent solid such as gels of Silica and/or Alumina, zeolites, clays, organic polymer salts such as polystyrene sulfonic acid sodium salt (PSSA-Na) with Triethylene Glycol (TEG) or preferably Polyethylene Glycol (PEG), or other amines. An unexpected and advantageous feature is that certain amounts of the additive of solid sorbent (soluble or insoluble) to a given quantity of liquid sorbent results in a composite mixture which is still liquid and exhibits a sorption capacity greater than the algebraic sum of the individual sorptior, capacities of its components. The individual constituent materials and compounds exhibit sorptive properties towards a variety of chemical vapors and gases, and moisture (water vapor) sorption is most important herein in the untilization of these liquid composites in humidity control air conditioning. And, the affinity of these sorbent mixtures for other vapors such as volatile organic compounds (VOCs) is also significant and highly utilitarian in air conditioning. The result is new compositions of matter characterized by composite mixtures of solid ant liquid sorbent materials. In practice, a 4% to 15% increase in TEG moisture adsorption capacity has been attained by adding 10% PSSA—Li, or PSSA—Na. Commensurately improved performance results in the dehumidifying system equipment, which is conducive to down-sizing said equipment. Also, lower vapor pressures prevail in these polymer enhanced glycol mixtures, together with reduction of oxidation of the equipment structure. The aforesaid increased percentage in sorbent capacity is made in comparison to state of the art Tri ethylene chloride (LiCL) solutions.

According to the foregoing, the preferred desiccant additive is sulfonated Lithium $SO_3Li$, PSSALS in a solution and at viscosity that can be pumped and sprayed within a heat range of 80° F. to 225° F. db. The sorption properties of this Lithium polymer-salt solution is substantial and cost effective and provides a non-vaporizing desiccant that is reasonably stable.

Referring now to the air preconditioning apparatus and to FIG. 4 of the drawings, the dehumidifier of means D or contacter section 22 is a means that involves both the aforesaid relief air discharge duct 17 and the OSA intake duct 18, these two ducts being of substantially the same air flow capacity, as shown. Discharge duct 17 exhausts relief air RE to atmosphere at 20, while the separate and essentially parallel duct 18 receives outside air OSA at 21. In accordance with this invention, there is adsorption means for removal of humidity from the outside air OSA flowing therethrough in the form of a heat-pipe means P for removing heat from the outside air OSA entering through the duct 18 and for rejecting said heat into the relief air RE exhausting through the duct 17. Accordingly, the heat absorber section 22 of the heat-pipe means P forms the dehumidifier contacter section in the flow of outside air OSA from the entry at 21 to the downstream discharge at duct 15. And, the heat rejecter section 23 of the heat-pipe means P exhausts heated relief air RE to atmosphere at 20.

The dehumidifier contactor section 22 heats the incoming outside air OSA as a result of the desiccant adsorption of water vapor, during which said outside air is cooled by the heat absorber section 22 of the heat-pipe means P. A distribution means or spray bar 25 supplied with strong glycol-polymer solution desiccant from a pump 26 wets the heat-pipe section 22 through which the air column flows. A sump 27 collects the fall of weak liquid desiccant from the heat pipe fins, and from which the desiccant is recirculated through a reflux boiler B for regeneration, as will be described by means of pimp 26. The desiccant supply is subject to depletion due to evaporation of its water content when operated in the humidification mode, and it is replenished by a float control valve 28 supplied with make-up desiccant, as shown in FIG. 8.

The heat-pipe means P cools the incoming outside air OSA flowing through the dehumidifier contacter section, by absorbing heat therefrom at its heat absorber section 22, and it heats the outgoing relief air RE by rejecting heat at its heat rejecter section 23. Accordingly, the heat absorber section 22 is in duct 18 while the heat rejecter section 23 is in duct 17.

The heat-pipe P is characterized by a hot end for absorption of heat and by a cold end for rejection of heat. In other words, there is a "heat in" end and a "heat out" end, for the normal summer cooling mode, which is inherently reversed for the normal winter heating mode. In carrying out this invention, the cold "heat out" rejecter section 23 is placed in the relief air RE exhaust duct 17, and the hot "heat in" absorber section 22 is placed in the outside air OSA inlet duct 18. A feature of this invention is that the heat absorber section 22 is the dehumidifier means D with the section 23 rejecting heat to exhaust air at 20. Accordingly, there is a heat transfer function that occurs between and from duct 18 to duct 17, so as to reduce the induction air temperature during dehumidification by the desiccant, and to increase the relief air RE temperature that is exhausted. In practice, transfer of heat energy from the incoming column of OSA air to the outgoing column of RE air is by means of a multiplicity of heat-pipe tubes, the cold end sections 23 in the form of heat dissipaters placed in the duct 17, and the hot end sections 22 in the form of heat absorbers placed in the duct 18 and functioning as the contacter for dehumidifying incoming air.

In accordance with this invention, the heat-pipes P are lengths of heat conductive tubing 33 sealed at their opposite ends, having interior fitting tubular wicks 34, and charged with a fluid refrigerant 35, a temperature responsive liquid-to-gas fluid (see FIG. 10). A temperature differential between the ends of each pipe causes the fluid refrigerant to migrate in its liquid state by capillary action to the warmer end where evaporation to its gaseous state takes place and thereby absorbs heat. The resultant gaseous refrigerant vapor then returns through the hollow interior of the tube, where it gives up the heat carried thereby, by condensing into the wick in order to repeat the cycle. The heat transfer process is efficent, since the heat pipes are sealed and have no moving parts, and therefore require little or no attention. The, heat-pipes are finned for most efficient heat energy transfer and for expansive contacter area (see FIG. 11).

In accordance with this invention, control of the heat-pipe means P involves evaporative cooling of the heat rejection section 23 thereof as and when required, to increase the cooling effect of the heat absorber section 22. As shown in FIG. 8, a spray bar 36 supplied with an evaporative liquid such as water from sump 37 by a recirculating pump 38 wets the finned air contacting exterior of the heat rejecter section 23 of the heat-pipe. In practice, the evaporative liquid is cold makeup water that has a sensible cooling effect as well as evaporative. A thermostat 24 senses temperature as a control means that determines coiling requirements. Referring to FIG. 4, the dehumidifier contacter means D involves the finned "heat in" section 22 of the heat-pipe means P. Section 22 of the heat-pipe functions as a dehumidifier by being sprayed with desiccant from a spray bar 25 supplied by a pump 26 drawing desiccant from the sump 27 as shown in FIG. 8. The spray bar 25 is horizontally disposed as shown, and the heat-pipe means P incorporates the dehumidifier features as described. A humidistat 24' in the conditioned space S (see FIG. 2) determines the humidification and dehumidification requirements and thereby controls the operational mode of the system.

The FIG. 4 embodiment features external regeneration of weakened desiccant, as by a reflux boiler means B, the details of which are shown in FIG. 9 of the drawings. This first embodiment can be combined with downstream refrigeration equipment as shown in FIG. 1, or it can be free standing alone as shown remote in FIG. 2. As hereinabove described, the weakened glycol based desiccant is collected by the sump 27 and is recirculated by the pump 26 to the spray bar 25. As shown in FIG. 4, recirculation of the weakened desiccant is through the regeneration boiler means B where it is subjected to heat in order to drive out the moisture adsorbed thereby during dehumidification of the incoming outside air OSA. As a result of the heat application for regeneration, there is a substantial amount of glycol vapor released from its liquid desiccant state, it being an object herein to recover the vaporized glycol and bring it to its liquid state for recirculation to the spray bar 25 as above described. To this end this invention provides regeneration in the form of the reflux boiler means B that subjects the weakened moisture or water saturated desiccant to a heat range within the dew points of water and the glycol that is employed. For example, between 212° F. to boil off the water and 345° F. (or less) to prevent boiling off the glycol or that portion of the enhanced glycol desiccant employed.

Referring now to the reflux boiler means B for desiccant regeneration as shown in FIG. 9 of the drawings, there is a multi-stage liquid to vapor separator column 40, each stage being comprised of a liquid holding tray 41 with percolating means 42 through which liquid glycol desiccant drops to the next lower tray and from which released water vapor rises to a header 43. The, lower sump end 44 of the column is subjected to the high heat within the 212° F. to 345° F. range, each successively higher tray being subjected to a lesser temperature, and the uppermost tray being subjected to the lower heat within the 212° F. to 345° F. range. A feature of the reflux boiler means B is the separate condensing chamber means 45 in open communication with the header 43 and maintained at the 212° F. dew point of water. The upper chamber portion houses a condensing coil 46 through which a coolant is recirculated through an outside heat rejecting coil 47 by a pump 48. Water-vapor condenses on the coil 46 and drops into the water discharge sump portion 47 of the condensing chamber 45. The uppermost separator tray 41 is supplied with water for percolation by an overflow 50 from the sump portion 49. Regenerated glycol desiccant, purged of water, is recovered at the sump end discharge 51 heated to 345° F. below the dew point of the glycol.

The FIG. 5 embodiment features internal regeneration of weakened desiccant. That is, the glycol desiccant is regenerated and its vapors recovered in combination with the heat-pipe dehumidifier and its components. This second embodiment can be combined with downstream refrigeration equipment as shown in FIG. 1, or it can be free standing alone as shown remote in FIG. 2 of the drawings. The heat-pipe dehumidification of the outside air OSA is the same here as above described with respect to the first embodiment, while the regeneration of weakened desiccant benefits from the heat of compression recovered from the downstream air conditioning refrigeration equipment; and benefits from the heat of condensation recovered from the process of dehumidification.

As shown in FIG. 2 there is at least one and preferably a multiplicity of conditioned air spaces S in each of which there is a fan and coil unit A/C that refrigerates and distributes mixed return air RE and preconditioned outside air OSA. Remote compressor-condenser units C serve each fan unit by recirculating pressurized refrigerant through an expansion valve 60 and through a coil 61. A fan 62 delivers the supply air SA into the air space S. And, the coil 61 discharges the depressurized refrigerant to a compressor 63 from which the heat of compression is normally rejected by a condenser coil 64. However and in accordance with this invention, the heat of compression is recovered partially or exclusively by means of a condenser coil 65 and employed in the desiccant regeneration process.

In accordance with this invention, first stage heating of the relief air RE passing through the preconditioner duct 17 is performed by the heat of rejection from the cold "heat out" ends of the heat-pipes P, bringing the air column temperature up to approximately 70° F. to 77° F.

In accordance with this invention, a substantial amount of heat of compression from the downstream refrigeration units is recovered by delivering the compressed and heated refrigerant through a heat dissipating condenser coil 65 positioned in the preconditioner air intake duct 17 for second stage heating of relief air RE, bringing the air column temperature up to approximately 77° F. to 100° F. The condenser coil 65 can be an auxiliary coil in series from the normal condenser coil 64, or it can replace said coil 64. In practice, the refrigeration condenser coil 65 is placed in the relief air duct following the cold "heat out" ends of the heat-pipes P so as to raise the air column temperature drawn. therethrough by a fan 66. As shown, a fan 67 delivers the outside air OSA through the duct 18, both fans being located in the free standing preconditioner unit.

Third stage heating of the relief air RE to approximately 140° F. to 190° F. is by means of a gas fired furnace means F or the like (see FIG. 5), through which the column of relief air RE passes to an air to desiccant contacter mesh or packing 68 wetted with the weakened desiccant by means a of a spray bar 69. The relief air passes through the contacter mesh 68 and exits therefrom with entrained water vapor and trace amounts of glycol vapor resulting from desorption of the desiccant.

Referring now to the desiccant flow circuit as shown in FIGS. 5 and 6, weakened and heated desiccant is delivered by the pump 26 from the sump 27 of the dehumidifier contacter heat-pipe ends 22. Delivery of the weakened desiccant heated by the heat of condensation is through a heat exchanger 70 that precools the strengthened desiccant heated by the regeneration process. A feature is the delivery of the weakened desiccant thorugh a dual purpose glycol recovery coil 71 in the heated relief air RE column downstream from the contacter mesh 68 maintained by thermal and flow balance at a temperature below the dew point of the glycol, and above the dew point of the water vapor entrained in the relief air RE. The glycol recovery coil 71 is finned and from which the glycol vapors condense and drop into a sump 73 that underlies the regeneration mesh 65, the coil 71 and the downstream eliminator pack 74 that collects the last and very little remaining glycol droplets which then drop from said mesh and into the sump. The weakened desiccant heated by the heat of condensation during the dehumidification process adsorbs heat from the hot regenerated desiccant when delivered through the heat exchanger 70 by a pump 26, and also absorbs heat from the heated relief air RE when passing through the glycol recovery coil 71. The hot desiccant within a 95° F. to 110° F. range is then discharged into the regeneration mesh 62 by the spray bar 69. A pump, 75 returns the heated and regenerated desiccant through the heat exchanger 70 where it is precooled and delivered to the spray bar 25 for repeating the process cycle of dehumidification of incoming outside air OSA.

Having described only the typical preferred forms and applications of my invention, I do not wish to be limited or restricted to the specific details herein set forth, but wish to reserve to myself any modifications or variations that may appear to those skilled in the art, as set forth within the limits of the following claims.

I claim:

1. An air dehumidifying desiccant recovery system having an outside air inlet duct, a conditioned air supply duct into a conditioned space, a return air duct from said conditioned space and a relief exhaust air duct exhausting return air displaced by outside air and with blower means to transport said outside, supply, return and relief air, and including;

a heat-pipe means having a heat absorber section in the inlet duct and forming a contacter to remove the heat of adsorption by dehumidifying the inlet air, and a heat rejecter section in the relief exhaust air duct for discharging heat into exhaust relief air flow therethrough, a water adsorptive liquid glycol base desiccant and spray bar means applying the same to the heat absorber section-contacter of the heat-pipe means for interface contact with incoming outside air to absorb water vapor therefrom, and desiccant regenerater means external of said air ducts and receiving weakened liquid glycol desiccant from said heat absorber section-contacter of the heat-pipe means, and comprised of a heat source means applying heat to the weakened liquid glycol base desiccant to remove water therefrom and discharge said water.

2. The air dehumidifying desiccant recovery system as set forth in claim 1, wherein the water adsorptive liquid glycol base desiccant is predominantly polyethylene glycol.

3. The air dehumidifying desiccant recovery system as set forth in claim 2, wherein a moisture adsorptive additive is admixed to the liquid glycol base desiccant.

4. The air dehumidifying desiccant recovery system as set forth in claim 2, wherein a moisture adsorptive polymer additive is admixed to the liquid glycol base desiccant.

5. The air dehumidifying desiccant recovery system as set forth in claim 4, wherein a moisture adsorptive polymer is admixed by at least 10% by weight of said adsorptive mixture.

6. The air dehumidifying desiccant recovery system as set forth in claim 4, wherein the moisture adsorptive polymer is polystyrene sulfonic acid sodium salt.

7. The air dehumudifying desiccant recovery system as set forth in claim 4, wherein the moisture adsorptive polymer is polystyrene sulfonic acid lithium salt.

8. The air dehumidifying desiccant recovery system as set forth in claim 5, wherein the moisture adsorptive polymer additive is polystyrene sulfonic acid sodium salt.

9. The air dehumidifying desiccant recovery system as set forth in claim 5, wherein the moisture adsorptive polymer additive is polystyrene sulfonic acid lithium salt.

10. The air dehumidifying desiccant recovery system as set forth in claim 1, wherein the heat absorber section of the heat-pipe means is comprised of heat-absorption ends of tubes wetted with said desiccant and having interface contact with incoming outside air.

11. The air dehumidifying desiccant recovery system as set forth in claim 1, wherein the heatabsorber section of the heat-pipe means is comprised of finned heat-absorption ends of tubes wetted with said desiccant and having interface contact with incoming outside air.

12. The air dehumidifying desiccant recovery system as set forth in claim 1, wherein the desiccant regenerater means is a reflux boiler means for separating the water from weakened desiccant collected from the heat absorber section-contacter, there being pump means for recirculating strengthened desiccant to said spray bar means.

13. The air dehumidifying desiccant recovery system as set forth in claim 12, wherein the reflux boiler means is comprised of a vapor separator column through which liquid desiccant drops, with heat subjecting means for vaporizing water therefrom, and a water vapor condensing means for separately collecting said water.

14. The air dehumidifying desiccant recovery system as set forth in claim 12, wherein the reflux boiler means is comprised of a vapor separator column through which liquid desiccant drops, with heat subjecting means operating within a range of temperature for vaporizing water therefrom, and a water vapor condensing means operating at the dew point of water for separately condensing said water vapor.

15. The air dehumidifying desiccant recovery system as set forth in claim 12, wherein the reflux boiler means is comprised of a vapor separator column through which liquid desiccant drops, with heat subjecting means operating within a temperature range of 212° F. to 345° F. for vaporizing water therefrom, and a water vapor condensing means operating at the 212° F. dew point of water for separately condensing said water vapor.

16. The air dehumidifying desiccant recovery system as set forth in claim 1, wherein a water spray bar means applies evaporative water to the heat rejecter section of the heat-pipe means for interface contact with the exhaust flow of relief air to increase the cooling effect of the heat absorber section of the heat-pipe by means of both sensible and evaporative cooling.

17. The air dehumidifying desiccant recovery system as set forth in claim 16, wherein the heat rejecter section of the heat-pipe means is comprised of heat-rejection ends of tubes wetted with said evaportive water and having interface contact with outgoing relief air.

18. The air dehumidifying desiccant recovery system as set forth in claim 16, wherein the heat rejecter section of the heat-pipe means is comprised of heat-rejection ends of finned tubes wetted with said evaporative water and having interface contact with outgoing relief air.

19. An air dehumidifying desiccant recovery system having an outside air inlet duct, a conditioned air supply duct into a conditioned space, a return air duct from said conditioned space and a relief exhaust air duct exhausting return air displaced by outside air and with blower means to transport said outside, supply, return and relief air, and including;

a heat-pipe means having a heat absorber section in the inlet duct and forming a contacter to remove the heat of adsorption by dehumidifying the inlet air, and a heat rejecter section in the relief exhaust air duct for discharging heat into exhaust relief air flow therethrough, a water adsorptive liquid glycol base desiccant and spray bar means applying the same to the heat absorber section-contacter of the heat-pipe means for interface contact with incoming outside air to absorb water vapor therefrom, and desiccant regenerater and glycol recovery means in the relief exhaust air duct, receiving weakened liquid glycol base desiccant from said heat absorber section-contacter of the heat-pipe means, and comprised of a heat source means having means heating the relief air with a water spray bar means applying evaporative water to the heat rejecter section of the heat-pipe means for interface contact with the exhaust flow of relief air to increase the cooling effect of the heat absorber section of the heat-pipe by means of both sensible and evaporative cooling.

20. The air dehumidifying desiccant recovery system as set forth in claim 19, wherein the desiccant regenerater heat source means includes heating the relief air with heat of compression from a condenser of an associated air conditioning refrigeration unit, said condenser being disposed in the relief exhaust air duct.

21. The air dehumidifying desiccant recovery system as set forth in claim 19, wherein the desiccant regenerater heat source means includes heating the relief air with a furnace operating up to the relief air temperature required to vaporize water from the weakened desiccant, said furnace being disposed in the relief exhaust air duct.

22. The air dehumidifying desiccant recovery system as set forth in claim 19, wherein the desiccant regenerater heat source means includes first stage heating of the relief air with said water spray bar means, a second stage heating of the relief air with heat of compression from a condenser of an associated air conditioning refrigeration unit, said condenser being disposed in the relief exhaust air duct, and a third stage heating of the relief air with a furnace operating up to the relief air temperature required to vaporize water from the weakened desiccant, said furnace being disposed in the relief exhaust air duct.

23. The air dehumidifying desiccant recovery system as set forth in claim 19, wherein the desiccant regenerater and glycol recovery means includes an air to desiccant contacter mesh downstream from the heat source means, and spray bar means applying weakened glycol base desiccant thereto for interface contact with the outgoing relief exhaust air, said weakened desiccant being transported to said spray bar means by pump means from a sump underlying the heat absorber section of the heat-pipe means.

24. The air dehumidifying desiccant recovery system as set forth in claim 23, there being a heat exchanger means transferring heat out of the strengthened desiccant heated by regeneration and pre-heating the weakened desiccant for regeneration by the heated exhaust relief air.

25. The air dehumidifying desiccant recovery system as set forth in claim 23, wherein the means to recover glycol includes a dual purpose glycol recovery coil downstream from said air to desiccant contacter mesh and spray bar means, and through which coil the weakened glycol base desiccant passes at a temperature below the dew point of the glycol therein and above the dew point of the water vapor entrained in the exhaust relief air, whereby entrained glycol vapors are condensed for recirculation with the strengthened glycol base desiccant.

26. The air dehumidifying desiccant recovery system as set forth in claim 23, wherein the means to recover glycol includes an eliminator pack downstream from the air to desiccant contacter mesh and through which the relief air exhausts, for collection of glycol droplets condensed thereby for recirculation with the strengthened glycol base desiccant.

27. The air dehumidifying desiccant recovery system as set forth in claim 19, wherein the desiccant regenerater and glycol recovery means includes an air to desiccant contacter mesh downstream from the heat source means, and spray bar means applying weakened glycol base desiccant thereto for interface contact with the outgoing relief exhaust air, said weakened desiccant being transported to said spray bar means by pump means from a sump underlying the heat absorber section of the heat-pipe means, there being a heat exchanger means transferring heat out of the strengthened desiccant heated by regeneration and pre-heating the weakened desiccant for regeneration by the heated exhaust relief air, a dual purpose glycol recovery coil downstream from said air to desiccant contacter mesh and spray bar means, and through which coil the weakened glycol base desiccant passes at a temperature below the dew point of the glycol therein and above the dew point of the water vapor entrained in the exhaust relief air, whereby entrained glycol vapors are condensed for recirculation with the strengthened glycol base desiccant, and an eliminator pack downstream from the air to desiccant contacter mesh and through which the relief air exhausts, for collection of glycol droplets condensed thereby for recirculation with the strengthened glycol base desiccant.

* * * * *